United States Patent
Shoyu et al.

(10) Patent No.: US 11,470,966 B2
(45) Date of Patent: Oct. 18, 2022

(54) GUIDING APPARATUS

(71) Applicant: THK CO., LTD., Tokyo (JP)

(72) Inventors: Takahiro Shoyu, Tokyo (JP); Hiroomi Kuribayashi, Tokyo (JP); Akito Kaneko, Tokyo (JP); Toshiro Minami, Tokyo (JP); Hajime Fukushima, Tokyo (JP); Takama Igarashi, Tokyo (JP); Tomoki Obayashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 17/291,749

(22) PCT Filed: Nov. 5, 2019

(86) PCT No.: PCT/JP2019/043263
§ 371 (c)(1),
(2) Date: May 6, 2021

(87) PCT Pub. No.: WO2020/095890
PCT Pub. Date: May 14, 2020

(65) Prior Publication Data
US 2021/0361068 A1 Nov. 25, 2021

(30) Foreign Application Priority Data

Nov. 9, 2018 (JP) .............................. JP2018-211806

(51) Int. Cl.
*A47B 88/57* (2017.01)
*A47B 88/477* (2017.01)

(52) U.S. Cl.
CPC ............ *A47B 88/57* (2017.01); *A47B 88/477* (2017.01)

(58) Field of Classification Search
CPC .............................. A47B 88/57; A47B 88/477
(Continued)

(56) References Cited

U.S. PATENT DOCUMENTS

| | | | | |
|---|---|---|---|---|
| 1,751,060 A | * | 3/1930 | Raalte | A47B 88/49 312/334.32 |
| 3,773,395 A | * | 11/1973 | Antonaccio | F16C 29/04 384/18 |

(Continued)

FOREIGN PATENT DOCUMENTS

JP 3291272 B2 6/2002

OTHER PUBLICATIONS

International Search Report dated Jan. 28, 2020, issued in counterpart International Application No. PCT/JP2019/043263, with English Translation (4 pages).
(Continued)

*Primary Examiner* — James O Hansen
(74) *Attorney, Agent, or Firm* — WHDA, LLP

(57) ABSTRACT

The guiding apparatus includes a first member having a sliding groove formed along a longitudinal direction; and a plurality of second members which are slidably assembled along the sliding groove so as to hold the first member in between, wherein the first member is formed with a first mounting hole on a bottom surface of the sliding groove, and the second member is formed with a second mounting hole on a surface opposed to the bottom surface, and wherein a stopper member is mounted to each of the first mounting hole and the second mounting hole, each of the stopper member having an insertion part which is to be inserted into each of the first mounting hole and the second mounting hole and is formed to be shorter in a length in an axial direction than a depth of the first mounting hole and the second mounting hole.

2 Claims, 9 Drawing Sheets

(58) Field of Classification Search
USPC .................... 312/334.1, 333, 334.27, 334.44
See application file for complete search history.

(56) References Cited

U.S. PATENT DOCUMENTS

| | | | | |
|---|---|---|---|---|
| 7,404,611 B1 * | 7/2008 | Que | ..................... | A47B 88/493 |
| | | | | 312/333 |
| 7,409,137 B2 * | 8/2008 | Barnes | ................. | G02B 6/4455 |
| | | | | 312/331 |
| 7,798,583 B2 * | 9/2010 | Yang | ..................... | A47B 88/40 |
| | | | | 312/334.46 |
| 2018/0172071 A1 | 6/2018 | Kuribayashi | | |

OTHER PUBLICATIONS

Decision to Grant a Patent dated Mar. 31, 2020, issued in counterpart of Japanese Patent Application No. 2018-211806, with English Translation. (5 pages).

Extended (Supplementary) European Search Report dated Oct. 26, 2021, issued in counterpart EP Application No. 19881265.3. (7 pages).

* cited by examiner

GUIDING APPARATUS

TECHNICAL FIELD

The present invention relates to a guiding apparatus, and more particularly to a slide rail having a stopper member for preventing a moving side rail from falling off.

BACKGROUND ART

It is known to mount a slide rail between a shelf or cabinet and a movable member such as a drawer or a door in order to smoothly move the movable member. Such a slide rail includes a fixed side rail which is mounted to the shelf or cabinet side, and a moving side rail which is mounted to the movable member side, and the moving side rail is slidably assembled to the fixed side rail via rolling elements such as balls. Moreover, in the slide rail, to prevent the moving side rail from falling off from the fixed side rail as the moving side rail moves, a stopper member is provided between the fixed side rail and the moving side rail to prevent the falling off.

Further, in order to secure a stroke amount of the moving side rail, it is known that a pair of inner members are slidably assembled to a center member to secure the stroke amount. As such a slide rail, there is known a slide rail which has a center member fitted between a pair of inner members, as described in Patent Literature 1.

CITATION LIST

Patent Literature

Patent Literature 1: Japanese Patent No. 3291272

DISCLOSURE OF THE INVENTION

Problems to be Solved by the Invention

However, in the slide rail according to Patent Literature 1 described above, a stopper for preventing the inner member from falling off achieve a stopper function by a bolt mounted to the inner member abutting against a protrusion formed on the center member. When a bolt is used as the stopper in this way, since both the bolt and the protrusion are made of metal, a metal collision noise occurs at the time of abutment, and there is a demand to reduce such metal collision noise.

Moreover, in a conventional stopper using a bolt, since the bolt is mounted in a direction substantially perpendicular to the sliding direction of the inner member, there is a case that the load when the bolt comes into abutment with the protrusion is applied to the bolt as a shear load, thereby breaking the bolt.

The present invention has been made to solve the above described cases and has its object to provide a guiding apparatus which reduces metal collision noise in a stopper for preventing a rail such as an inner member from falling off in the assembled state of the guiding apparatus and has a structure in which a shear load due to the action of the stopper is less likely to be applied.

Means for Solving the Problems

The guiding apparatus according to the present invention that solves the above described cases includes: a first member having a sliding groove formed along a longitudinal direction; and a plurality of second members which are slidably assembled along the sliding groove so as to hold the first member in between, wherein the first member is formed with a first mounting hole on a bottom surface of the sliding groove, and the second member is formed with a second mounting hole on a surface opposed to the bottom surface, and wherein a stopper member is mounted to each of the first mounting hole and the second mounting hole, each of the stopper member having an insertion part which is to be inserted into each of the first mounting hole and the second mounting hole and is formed to be shorter in a length in an axial direction than a depth of each of the first mounting hole and the second mounting hole, and a protruding part protruding from each of the bottom surface and a surface opposed to the bottom surface, respectively.

Effects of the Invention

According to the guiding apparatus of the present invention, since the stopper member includes an insertion part to be inserted into the first mounting hole of the first member and the second mounting hole of the second member, and a protrusion part which protrudes from the bottom surface of the sliding groove of the first member and from a surface opposed to the bottom surface of the sliding groove of the second member, no load is applied to the bolt or the like to which the stopper is mounted, at the time of impact loading even when the protruding parts come into abutment with each other, thus enabling the prevention of breakage of the bolt in a structure that prevents the second member from falling off in the assembled state of the guiding apparatus.

MEANS FOR CARRYING OUT THE INVENTION

Hereinafter, embodiments of a slide rail as a guiding apparatus according to the present invention will be described with reference to the drawings. It should be noted that the following embodiments do not limit the invention according to each claim, and not all combinations of features described in the embodiments are essential for the solution of the invention.

First Embodiment

Figure 1:
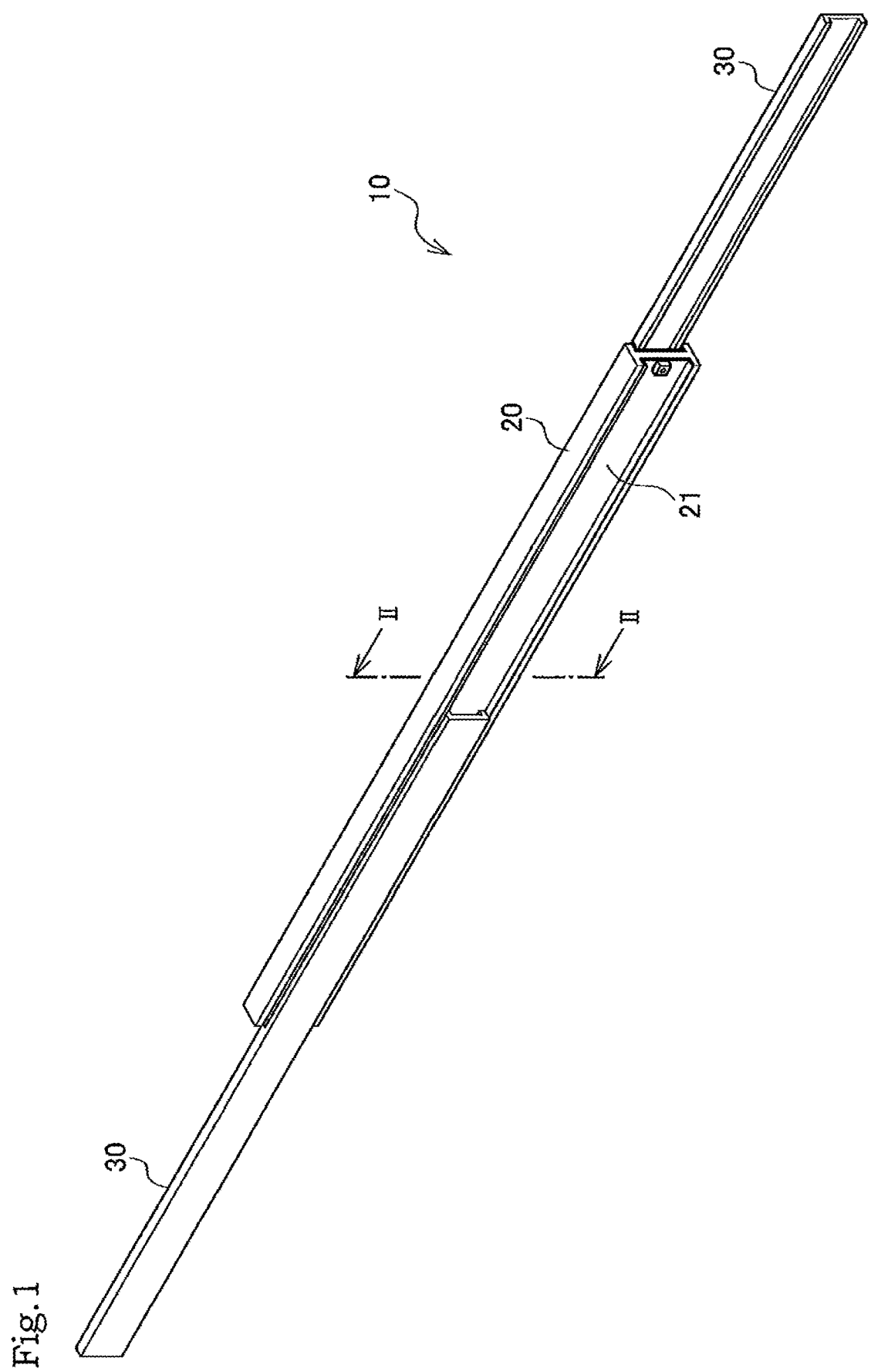
FIG. 1 is a perspective view of a slide rail according to a first embodiment of the present invention.
Figure 2:
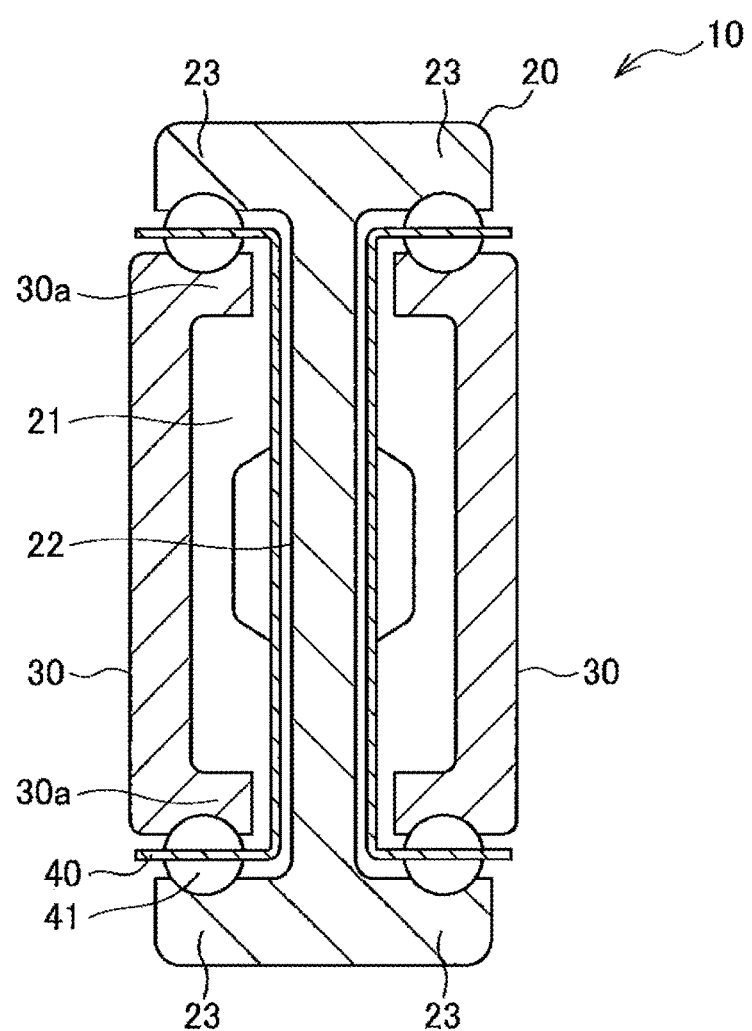
FIG. 2 is an II-II sectional view in FIG. 1.
Figure 3:
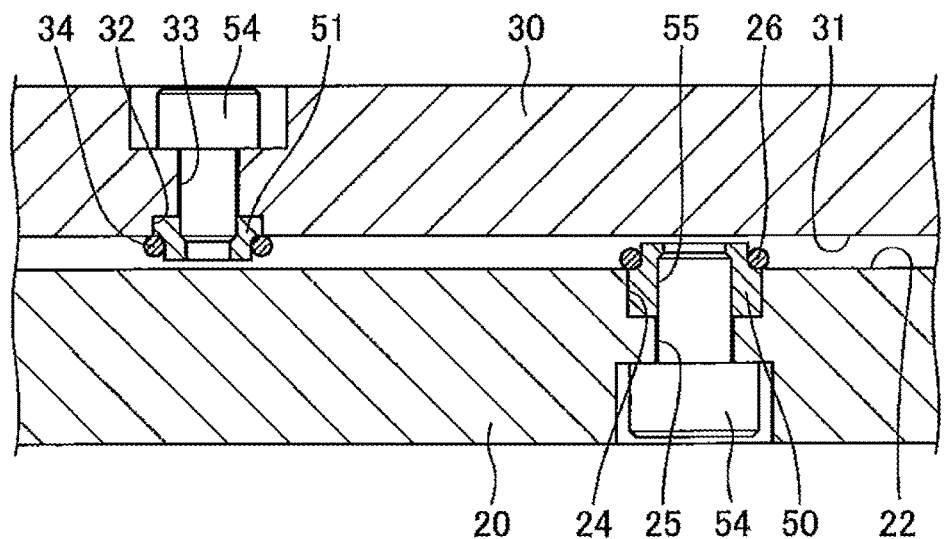
FIG. 3 is a sectional view for illustrating the structure of a stopper of the slide rail according to the first embodiment of the present invention.
Figure 4:
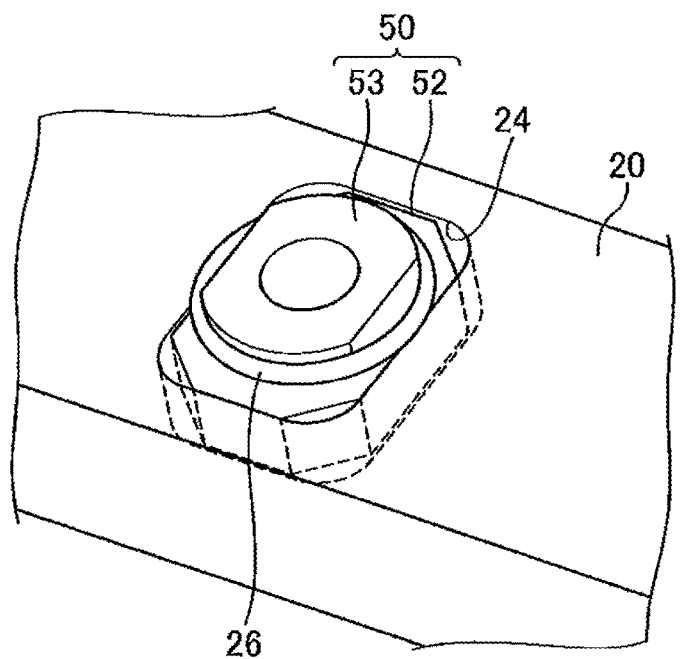
FIG. 4 is a perspective view for illustrating the mounted state of a stopper member of the slide rail according to the first embodiment of the present invention.

FIG. 1 is a perspective view of a slide rail according to a first embodiment of the present invention, FIG. 2 is an II-II sectional view in FIG. 1, FIG. 3 is a sectional view for illustrating the structure of a stopper of a slide rail according to the first embodiment of the present invention, and FIG. 4 is a perspective view for illustrating the mounted state of a stopper member of the slide rail according to the first embodiment of the present invention.

As shown in FIGS. 1 and 2, a slide rail 10 according to the present embodiment includes a center member 20 as a first member that has sliding grooves 21 formed on both side surfaces along the longitudinal direction, and a pair of inner members 30, 30 as a second member that is slidably assembled along the sliding grooves 21.

The sliding groove 21 of the center member 20 is formed by a bottom surface 22 and side walls 23 erected from both edges of the bottom surface 22, and the sliding grooves 21 are formed on both side surfaces of the center member 20 so that the cross section is formed in a substantially I shape. Further, the inner member 30 is a plate-shaped member, and both edges thereof are bent so as to be opposed to the side wall 23 so that an opposed wall 30a is formed so as to be opposed to the side wall 23.

The center member 20 and the inner member 30 are assembled to each other via rolling elements 41 such as balls, and the rolling elements 41 are assembled so as to be rollable in a rolling-element rolling groove formed between the side wall 23 and the opposed wall 30a and are held by a retainer 40 to prevent falling off of the rolling elements 41 and collision between the rolling elements 41.

Next, the stopper of the slide rail 10 according to the present embodiment will be described with reference to FIGS. 3 and 4. As shown in FIG. 3, the stopper of the slide rail 10 according to the present embodiment serves as a stopper by mounting a center side stopper 50 and an inner side stopper 51 to the center member 20 and the inner member 30, respectively, and configuring the center side stopper 50 and the inner side stopper 51 to abut with each other.

The center side stopper 50 is inserted into a first mounting hole 24 formed in the bottom surface 22 of the sliding groove 21 of the center member 20, and is jointly fastened to a mounting hole 55 of the center side stopper 50 and a bolt hole 25 of the center member 20 by means of a mounting bolt 54. The first mounting hole 24 is configured as a counterbore hole formed in the bottom surface 22 and is configured such that an insertion part 52 of the center side stopper 50 can be assembled thereto. Moreover, the height of the insertion part 52 is formed to be smaller than the depth of the first mounting hole 24; a protruding part 53 is extended so as to protrude from the bottom surface 22 in the upper end surface of the insertion part 52; and a cushioning member 26 made of an elastic body is mounted to the outer peripheral surface of the protruding part 53. The cushioning member 26 is preferably made of rubber or the like, and more preferably, a ring-shaped O-ring or the like is preferably used.

As shown in FIG. 4, the first mounting hole 24 and the insertion part 52 are formed in a substantially rectangular shape which is longer in the width direction, and are configured such that when the inner member 30 slides along the longitudinal direction and comes into abutment with the center side stopper 50, the load is received on the longer side portion so that the area where the load is applied can be secured, thus securing the rigidity.

Further, since the cushioning member 26 is mounted to the protruding part 53, it is possible to avoid abutment between metals, thereby suppressing collision noise in a structure for preventing the inner member from falling off in the assembled state of the slide rail.

The inner side stopper 51 has the same basic structure as that of the center side stopper 50, but the height of the insertion part 52 is formed to be smaller due to the difference in thickness between the center member 20 and the inner member 30. Further, the second mounting hole 32 formed in the mounting surface 31, which is an opposed surface to the bottom surface 22 of the inner member 30, is formed as a counterbore hole like the first mounting hole 24, and is formed such that the bolt hole 33 passes through to the opposite surface.

In this way, by configuring the inner side stopper 51 in the same manner as with the center side stopper 50, it is possible to secure the area for applying the load by receiving the load on the longer side portion, thereby securing the rigidity, and it is possible to avoid abutment between metals, thereby suppressing collision noise in a structure for preventing the inner member from falling off in the assembled state of the slide rail.

Second Embodiment

In the slide rail 10 according to the first embodiment described above, description has been made on a case in which a stopper is configured by mounting the center side stopper 50 and the inner side stopper to the center member 20 and the inner member 30, respectively, and bringing the center side stopper 50 and the inner side stopper 51 into abutment with each other. In the slide rail according to the second embodiment described below, description will be made on an example of a stopper member which has a form different from that of the slide rail according to the first embodiment. It is noted that the same or similar members as those in the first embodiment described above are given the same reference symbols, thereby omitting detailed description thereof.

Figure 5:
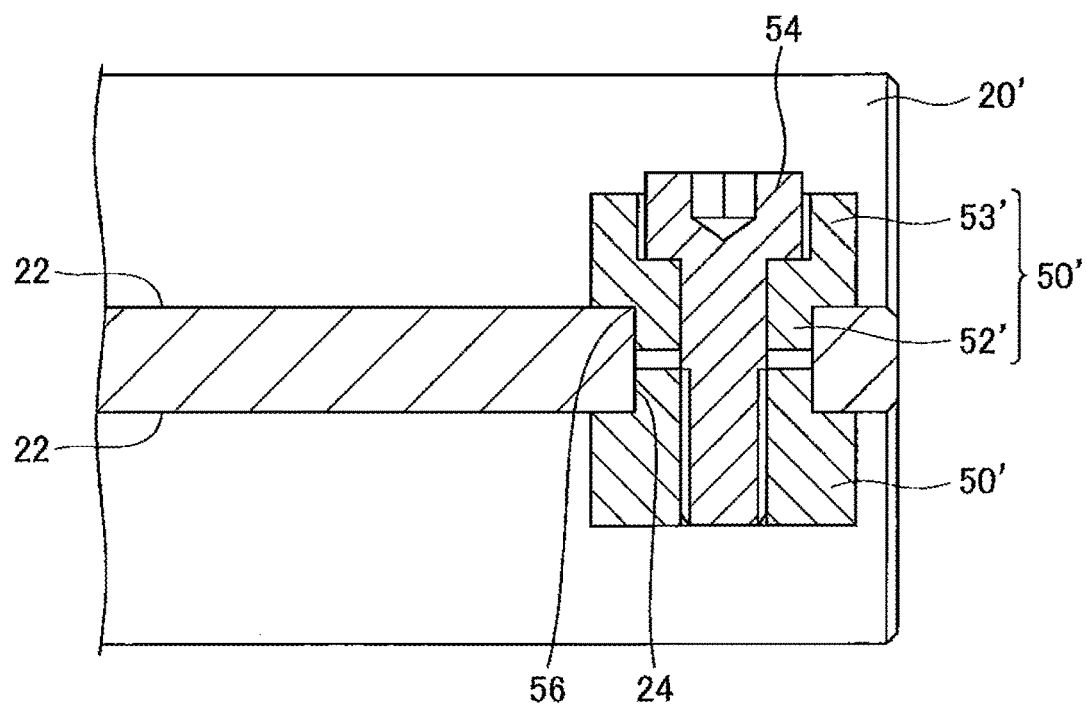
FIG. 5 is a sectional view for illustrating the structure of a stopper of a slide rail according to a second embodiment of the present invention.
Figure 6:
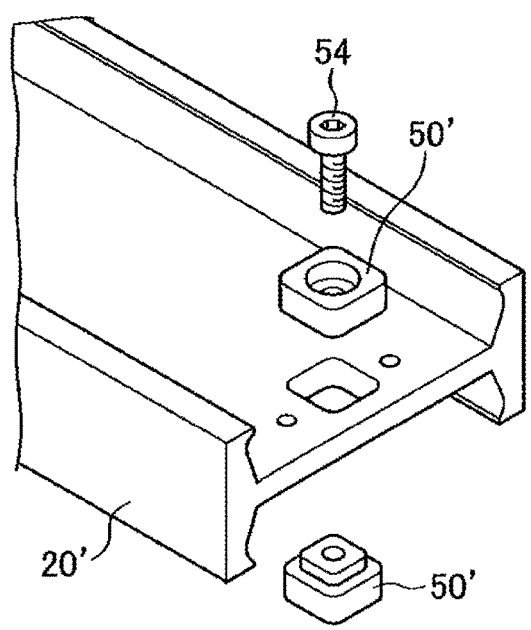
FIG. 6 is a perspective view for illustrating a mounted state of a stopper member of a center rail of the slide rail according to the second embodiment of the present invention.
Figure 7:
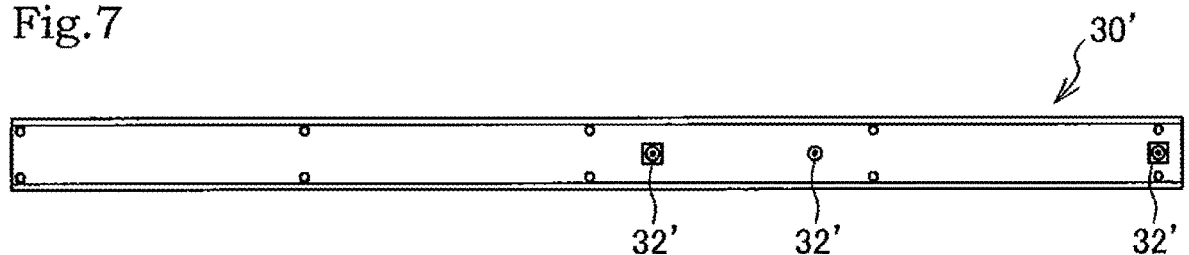
FIG. 7 is a front view of an inner rail of the slide rail according to the second embodiment of the present invention.
Figure 8:
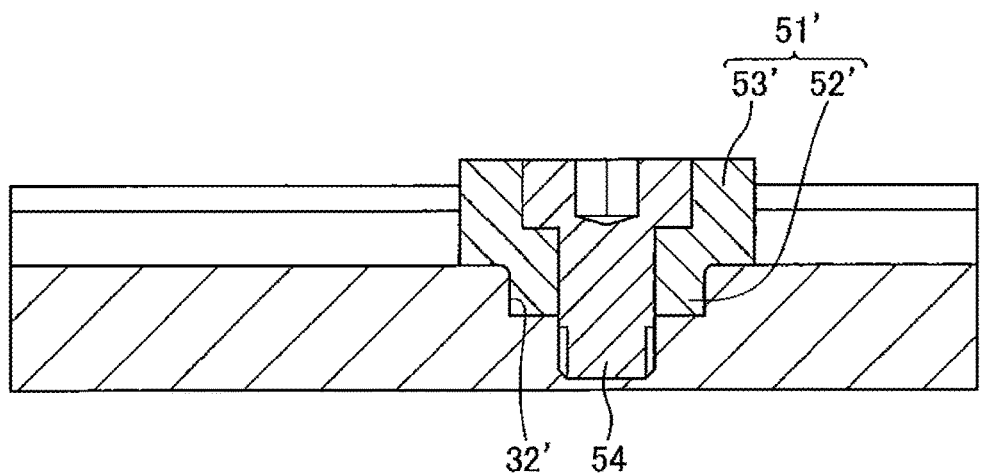
FIG. 8 is a sectional view for illustrating the mounted state of a stopper member of the inner rail side of the slide rail according to the second embodiment of the present invention.

FIG. 5 is a sectional view for illustrating the structure of a stopper of a slide rail according to a second embodiment of the present invention, FIG. 6 is a perspective view for illustrating a mounted state of a stopper member of a center rail of the slide rail according to the second embodiment of the present invention, FIG. 7 is a front view of an inner rail of the slide rail of the second embodiment of the present invention, and FIG. 8 is a sectional view for illustrating the mounted state of the stopper member of the inner rail side of the slide rail according to the second embodiment of the present invention.

As shown in FIGS. 5 and 6, the center member 20' of the slide rail according to the present embodiment is formed such that the first mounting hole 24 of the center member passes through the bottom surface 22, and a center side stopper 50' is coaxially assembled to the first mounting hole 24.

While the center side stopper 50' includes an insertion part 52' and a protruding part 53' similarly to the center side stopper 50 of the slide rail according to the first embodiment, the insertion part 52' is formed to be smaller in the longitudinal section than the protruding part 53'. That is, in the stopper member according to the present embodiment, a step part 56 is formed in a continuous part between the insertion part 52' and the protruding part 53', and the step part 56 is in abutment against the opening part of the first mounting hole 24. Further, as shown in FIG. 5, a predetermined gap is formed along the longitudinal direction between the first mounting hole 24 and the step part 56, and the center side stopper 50' is assembled so as to abut against one side (the right side in FIG. 5) in the longitudinal direction of the center member 20'. In this way, the center side stopper 50' is assembled so as to abut against the side to which the impact load is applied when the stoppers collide with each other, thereby resulting in a structure in which shear load is less likely to be applied to a mounting bolt 54.

Further, the center side stopper 50' is assembled from the vertical direction of the center member 20' and is fastened and fixed by the mounting bolt 54. It is noted that in the center side stopper 50', a center side stopper located on the upper side is formed with a counterbore part into which a bolt head of the mounting bolt 54 is inserted, and a center side stopper located on the lower side is formed with a screw groove into which the mounting bolt 54 is screwed.

As shown in FIGS. 7 and 8, the inner member 30' of the slide rail according to the present embodiment is configured such that a plurality of second mounting holes 32' are formed along the longitudinal direction, and the stroke amount of the inner member 30' can be adjusted by changing the mounting position of the inner side stopper 51'.

Further, the inner side stopper 51' has the same basic structure as that of the center side stopper 50', but the height of the insertion part 52' is formed to be smaller due to the difference in thickness between the center member 20 and the inner member 30. Further, the second mounting hole 32' formed on the surface of the inner member 30' opposed to the bottom surface 22 is formed as a counterbore hole, and is formed with a screw groove such that the mounting bolt 54 can be fastened thereto.

In this way, since the insertion part 52' is formed smaller in the longitudinal section than the protruding part 53', when the inner member 30' slides and comes into abutment with the center side stopper 50' and the inner side stopper 51', the insertion part 52' abuts against the inner peripheral surface of the first mounting hole 24 or second mounting hole 32' so that it is possible to achieve a structure in which shear load is less likely to be applied to the mounting bolt 54 in a structure that prevents the inner member from falling off in the assembled state of the slide rail, and it becomes possible to carry a heavy pay load with low sliding load without increasing the size of the stopper itself or increasing the rigidity of the slide rail itself.

Further, in this structure, since the continuous portion between the insertion part 52' and the protruding part 53' has a stepped shape, the stopper member can hold firmly on the bottom surface and the inner peripheral surface of the mounting hole with the stepped shape when load is applied in the impact direction. Therefore, it becomes possible to achieve a structure in which moment load is less likely to be applied to the mounting bolt 54 in the structure that prevents the inner member from falling off in the assembled state of the slide rail.

Further, as compared with a stopper structure using a pin, there is no need of processing the mounting hole and the stopper member with high accuracy so that the manufacturing cost can be reduced.

Third Embodiment

For the slide rails 10, 10' according to the first and second embodiments described above, description has been made on a case in which the center member 20, 20' and the inner member 30, 30' are respectively mounted with the center side stopper 50, 50' and the inner side stopper 51, 51', and the center side stopper 50, 50' and the inner side stopper 51, 51' are mounted to the center member 20, 20' and the inner member 30, 30' with the mounting bolt 54. For the slide rail according to the third embodiment described below, an example of a stopper member which has a different form from that of the slide rails according to the first and second embodiments will be described. The same or similar members as those in the first and second embodiments described above are given the same reference symbols, thereby omitting detailed description thereof.

Figure 9:
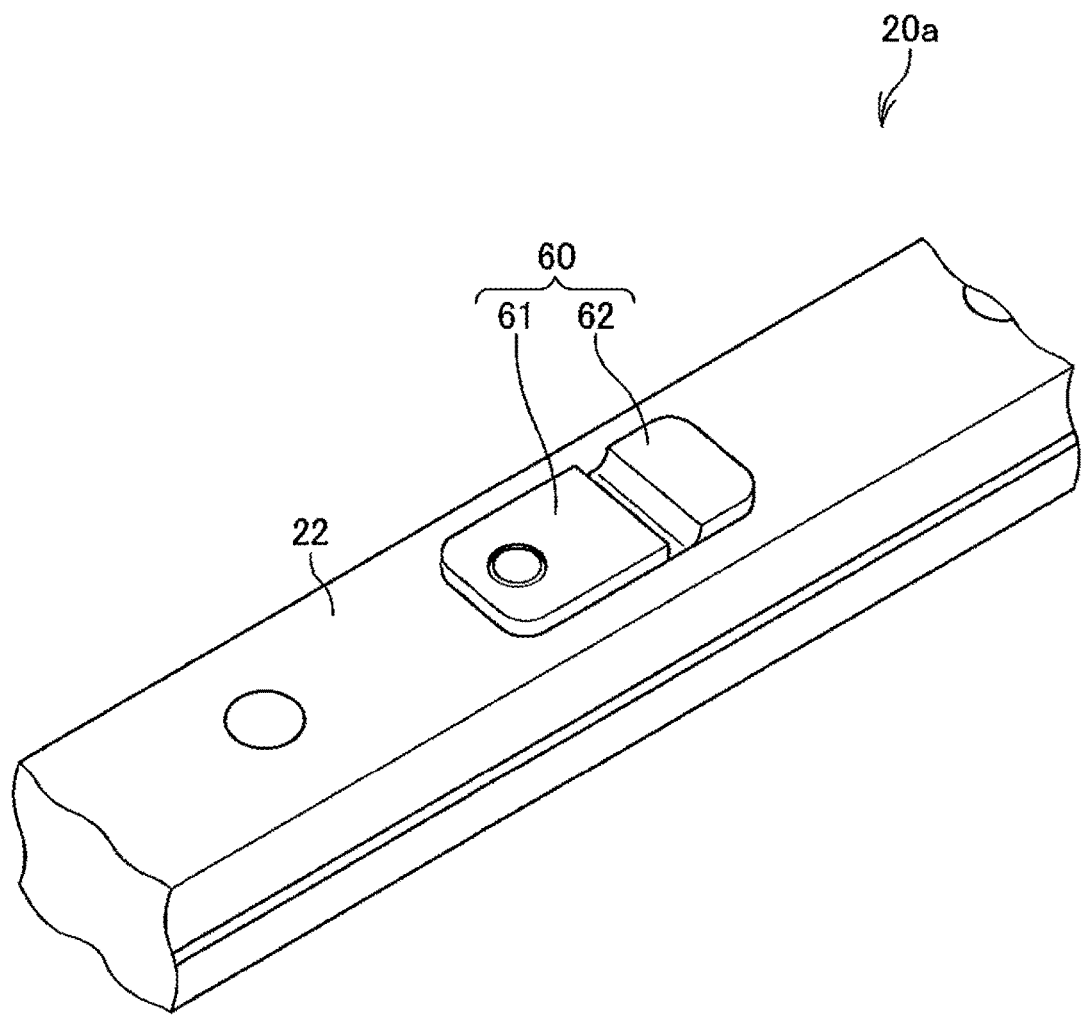
FIG. 9 is a perspective view for illustrating the mounted state of a stopper member of a center rail of a slide rail according to a third embodiment of the present invention.
Figure 10:
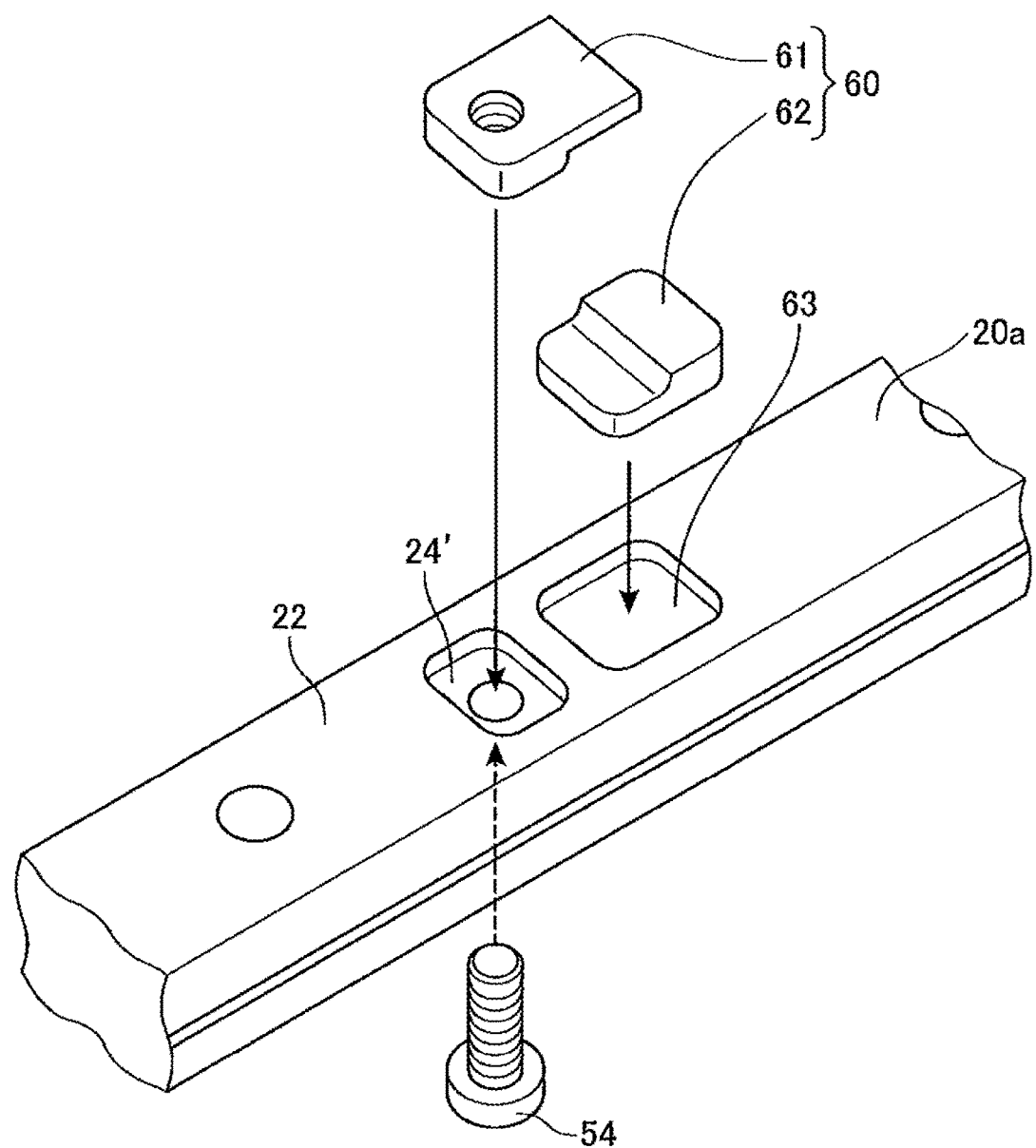
FIG. 10 is an exploded view for illustrating the mounting method of the stopper member of the center rail of the slide rail according to the third embodiments of the present invention.
Figure 11:
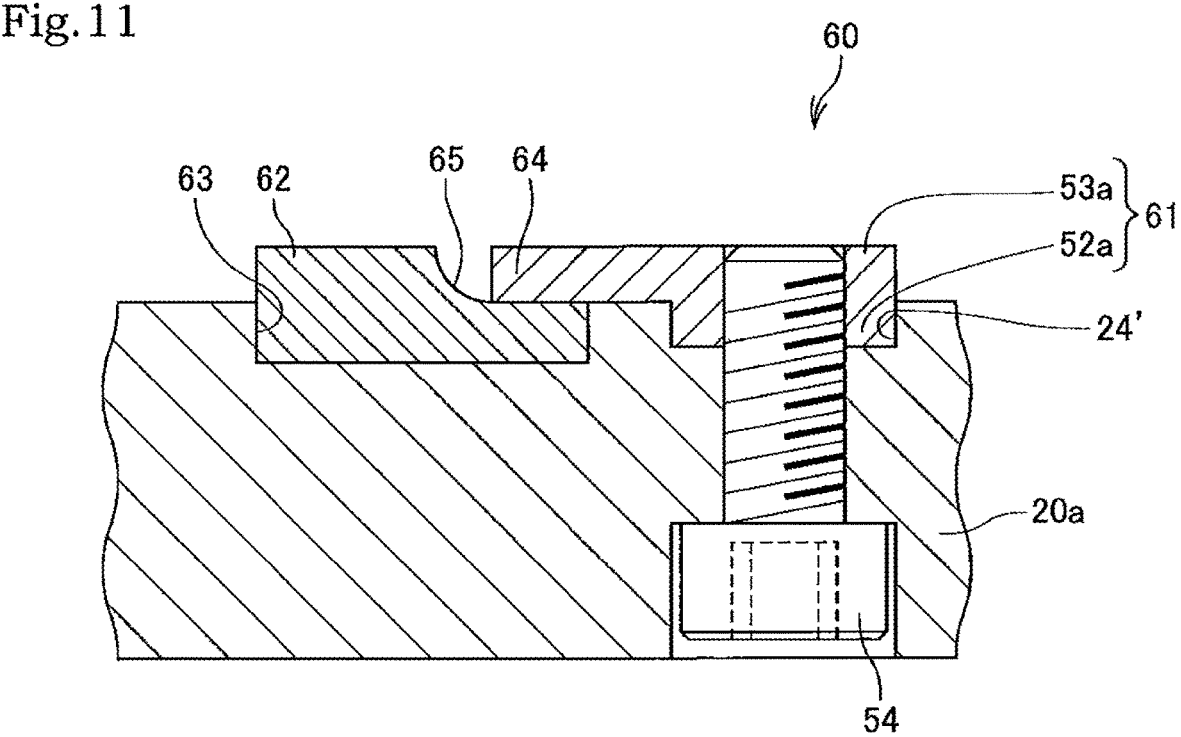
FIG. 11 is a sectional view for illustrating the structure of a stopper of the slide rail according to the third embodiment of the present invention.
Figure 12:
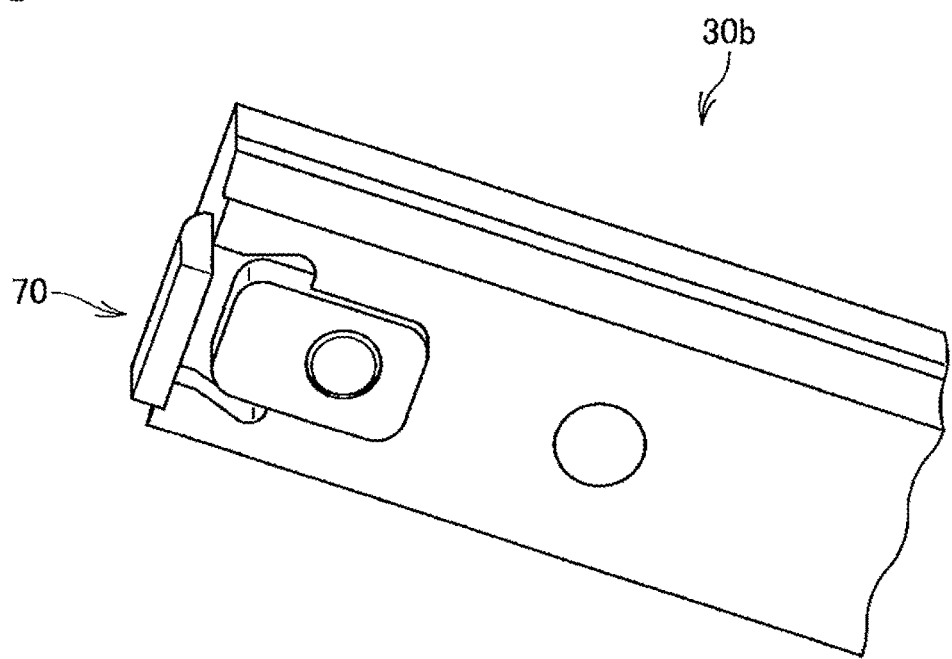
FIG. 12 is a perspective view for illustrating the mounted state of a stopper member of the inner rail of the slide rail according to the third embodiment of the present invention.
Figure 13:
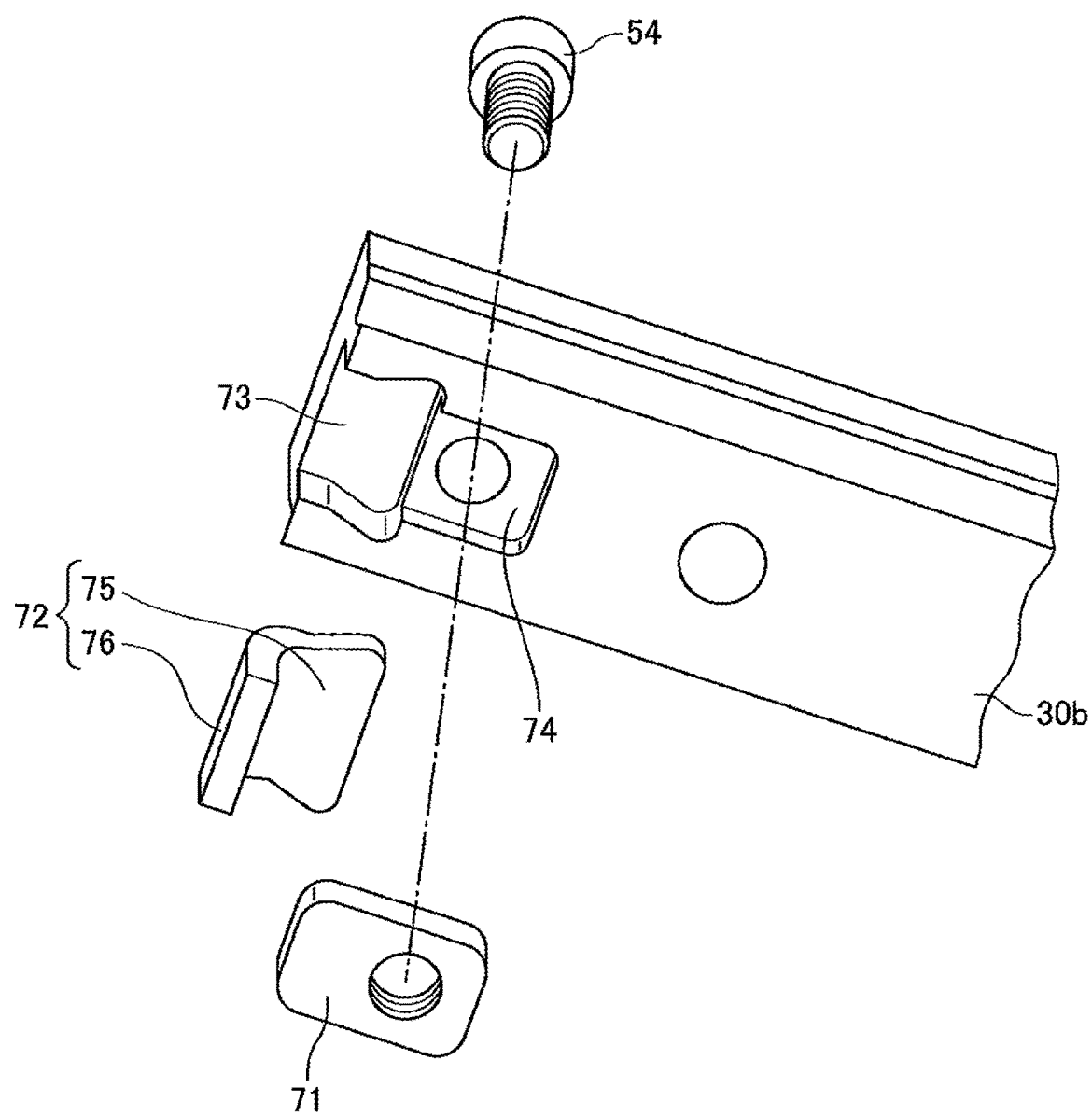
FIG. 13 is an exploded view for illustrating the mounting method of the stopper member of the inner rail of the slide rail according to the third embodiment of the present invention.
Figure 14:
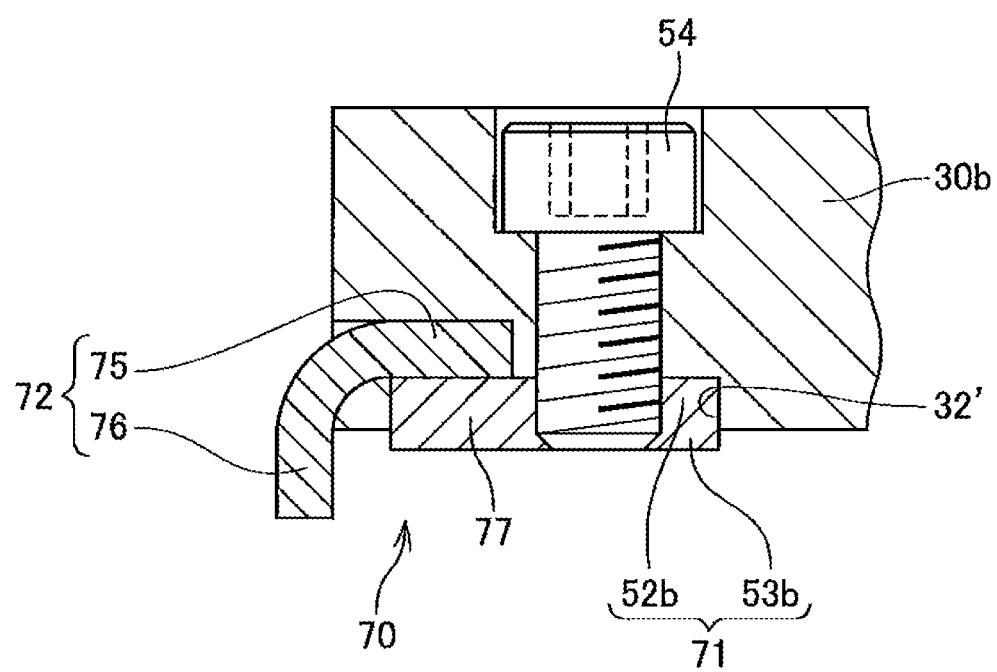
FIG. 14 is a sectional view for illustrating the structure of the stopper of the slide rail according to the third embodiment of the present invention.

FIG. 9 is a perspective view for illustrating the mounted state of a stopper member of a center rail of the slide rail according to a third embodiment of the present invention, FIG. 10 is an exploded view for illustrating the mounting method of the stopper member of the center rail of the slide rail according to the third embodiment of the present invention, FIG. 11 is a sectional view for illustrating the structure of the stopper of the slide rail according to the third embodiment of the present invention, FIG. 12 is a perspective view for illustrating the mounted state of the stopper member of the inner rail of the slide rail according to the third embodiment of the present invention, FIG. 13 is an exploded view for illustrating the mounting method of a stopper member of the inner rail of the slide rail according to the third embodiment of the present invention, and FIG. 14 is a sectional view for illustrating the structure of a stopper of the slide rail according to the third embodiment of the present invention.

As shown in FIGS. 9 and 10, a center side stopper 60 is mounted to the bottom surface 22 of the sliding groove of the center member 20a of the slide rail according to the present embodiment. The center side stopper 60 according to the present embodiment has a stopper retainer 61 and a stopper part 62, unlike the center side stoppers 50, 50' according to the first and second embodiments.

As shown in FIG. 10, on the bottom surface 22 of the center member 20a, a stopper mounting part 63 for mounting the stopper part 62 and a stopper retainer mounting part 24' for mounting the stopper retainer 61 are formed, and the stopper mounting part 63 and the stopper retainer mounting part 24' are both formed as a counterbore part having a bottom surface. Further, a bolt hole through which the mounting bolt 54 can be inserted is formed in the stopper retainer mounting part 24'.

As shown in FIG. 11, the center side stopper 60 has an insertion part 52a which is formed in the stopper retainer 61 and is to be inserted into the stopper retainer mounting part 24', and a protruding part 53a which protrudes from the bottom surface 22. Further, the stopper retainer 61 is formed with a retainer part 64 which extends along the longitudinal direction of the protruding part 53a and substantially in parallel with the bottom surface 22. Further, the stopper retainer 61 is fastened and fixed by the mounting bolt 54 from the opposite surface of the bottom surface 22 of the center member 20a.

The stopper part 62 is inserted into the stopper mounting part 63. The stopper part 62 is formed with a retained part 65 so as to correspond to the retainer part 64 of the stopper retainer 61, and the retained part 65 is fixed by being held between the retainer part 64 of the stopper retainer 61 and the bottom surface of the stopper mounting part 63. It is noted that the stopper part 62 may be made of a hard rubber material, a synthetic resin, or the like.

In the center side stopper 60 of the slide rail according to the present embodiment, even when the stopper part 62 inserted into the stopper mounting part 63 comes into abutment with an inner side stopper 70 described later, since the wall surface of the stopper mounting part 63 is present in the impact direction when the stoppers collide with each other, load is applied to the wall surface so that shear load is less likely to be applied to the mounting bolt 54, and breakage of the mounting bolt 54 can be prevented. Further, when the stopper part 62 is made of a hard rubber material, a synthetic resin, or the like, the occurrence of metallic noise can be suppressed even if the stopper parts 62 collide with each other.

As shown in FIGS. 12 and 13, while the inner side stopper 70 has the same basic configuration as that of the center side stopper 60 in that a stopper part 72 is held between the inner member 30b and a stopper retainer 71 and is fastened and fixed by the mounting bolt 54, the inner side stopper 70 is mounted to an end part in the longitudinal direction of the inner member 30b, and the shape of a stopper mounting part 73 to which the stopper part 72 is mounted is different.

The stopper mounting part 73 is formed as a counterbore part adjacent to a stopper retainer mounting part 74, and the counterbore depth of the stopper mounting part 73 is formed deeper than that of the stopper retainer mounting part 32'. Further, the stopper mounting part 73 is formed into a substantially trapezoidal shape such that the length in the width direction gradually decreases toward the end part in the longitudinal direction of the inner member 30b.

Further, the stopper part 72 has a retained part 75 which is inserted into the stopper mounting part 73 and is formed into a trapezoidal shape which is substantially the same as that of the stopper mounting part 73, and which is held in between by the stopper retainer 71, and a bent part 76 which is bent from the end part of the retained part 75 in a direction substantially perpendicular to the longitudinal direction so as to be abuttable with the center side stopper 60.

In this way, by making the stopper part 72 and the stopper mounting part 73 have a trapezoidal shape in which the width gradually narrows toward the end part in the longitudinal direction of the inner member 30b, the load which is received by the inner side stopper 70 when the stoppers collide with each other can be received by the trapezoidal slope as stress so that the load is not directly applied to the mounting bolt 54. Further, when the inner side stopper 70 receives a load, this load prevents the stopper part 72 from falling off from the end part of the inner member 30b.

As shown in FIG. 14, in the inner side stopper 70 according to the present embodiment, the stopper retainer 71 includes an insertion part 52b which is inserted into the stopper retainer mounting part 32', and a protruding part 53b protruding from the inner member 30b, and a stopper retainer part 77 that holds the stopper part 72 together with the bottom surface of the stopper mounting part 73 is formed.

Further, since the stopper part 72 has a bent part 76 which is bent in a substantially vertical direction toward the center member side so as to extend from the end part of the inner member 30b, the stroke amount when the inner member 30b moves with respect to the center member 20a can be maximized so that it is possible to reliably bear the load without causing breakage of the mounting bolt and the like with a simple structure, and to secure a sufficient stroke amount.

In the above described embodiment, although description has been made on the case where the center member and the inner member are assembled via the rolling elements, the structure may also be such that the center member and inner member are directly sliding without via the rolling elements. It is clear from the description of the claims that embodiments with such changes or improvements may be included in the technical scope of the present invention.

REFERENCE NUMERALS

10 Slide rail, 20, 20', 20a Center member, 21 Sliding groove, 22 Bottom surface, 24 Center side mounting hole, 26, 34 Cushioning member, 30, 30', 30b Inner member, 50, 50', 60 Center side stopper, 51, 51', 70 Inner side stopper, 52, 52' Insertion part, 53, 53' Protruding part, 56 step part, 61, 71 Stopper retainer, 62, 72 Stopper part, 63, 73 Stopper mounting part, 24', 32' Stopper retainer mounting part, 76 Bent part

The invention claimed is:
1. A guiding apparatus, comprising:
a first member having a pair of sliding grooves formed via a wall portion along a longitudinal direction; and
a plurality of second members which are slidably assembled along the pair of the sliding grooves so as to hold the first member in between, wherein
the first member is formed with a first mounting hole on a bottom surface of each of the sliding grooves, and
each of the second members is formed with a second mounting hole on a surface opposed to the bottom surface, and wherein
a stopper member is mounted respectively to the first mounting hole on the bottom surface of each of the sliding grooves and to the second mounting hole of each of the second members via a mounting bolt, the stopper member having an insertion part and a protruding part, the insertion part being inserted respectively into each of the first mounting hole and the second mounting hole, the insertion part being formed to be shorter in a length in an axial direction than a depth of each of the first mounting hole and the second mounting hole respectively, the protruding part protruding respectively from the bottom surface of each of the sliding grooves and from the surface of each of the second members opposed to the bottom surface, and the stopper member mounted to the first mounting hole coming into contact with the stopper member mounted to the second mounting hole during sliding of each of the second members relative to the first member.

2. The guiding apparatus according to claim 1, wherein a cushioning member is mounted to the protruding part.

* * * * *